(12) United States Patent
Vuori et al.

(10) Patent No.: US 7,305,260 B2
(45) Date of Patent: Dec. 4, 2007

(54) FUNCTION SPECIFIC INTERCHANGEABLE COVER PIECE FOR A MOBILE COMMUNICATION DEVICE

(75) Inventors: Petri Vuori, Salo (FI); Pekka Kostiainen, Helsinki (FI); Heikki Kasurinen, Salo (FI); Kai Inha, Järvenpää (FI); Heikki Halkosaari, Paimio (FI); Saku Lahti, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 126 days.

(21) Appl. No.: 10/769,466

(22) Filed: Jan. 30, 2004

(65) Prior Publication Data

US 2005/0170872 A1 Aug. 4, 2005

(51) Int. Cl.
*H04Q 7/20* (2006.01)
*H04M 1/00* (2006.01)
*H04B 1/38* (2006.01)

(52) U.S. Cl. ............ 455/575.8; 455/90.3; 455/575.7; 455/575.1; 455/550.1; 455/556.2; 455/457; 455/456.1; 455/456.6

(58) Field of Classification Search ............ 455/575.3, 455/550.1, 575.1, 90.3, 566, 456.1–456.6, 455/404.2, 457, 556.1, 556.2, 557–558, 575.8, 455/552.1, 575.7; 342/357.01, 357.06, 357.12, 342/350.1, 350.12, 350.13; 349/539.13

See application file for complete search history.

(56) References Cited

U.S. PATENT DOCUMENTS

| | | | |
|---|---|---|---|
| 5,023,936 A * | 6/1991 | Szczutkowski et al. .... | 455/90.2 |
| 5,043,736 A | 8/1991 | Darnell et al. ............. | 342/357 |
| 5,461,365 A | 10/1995 | Schlager et al. ........... | 340/573 |
| 5,517,683 A * | 5/1996 | Collett et al. ............ | 455/575.1 |
| 5,650,770 A | 7/1997 | Schlager et al. ........... | 340/573 |
| 5,786,789 A * | 7/1998 | Janky ..................... | 342/357.1 |
| 5,848,152 A * | 12/1998 | Slipy et al. ............ | 379/433.13 |
| 5,911,121 A * | 6/1999 | Andrews .................. | 455/418 |
| 6,016,431 A * | 1/2000 | Holshouser .............. | 455/575.7 |
| 6,128,515 A * | 10/2000 | Kabler et al. ............. | 455/566 |
| 6,292,147 B1* | 9/2001 | Ham ....................... | 343/702 |
| 6,411,826 B1 | 6/2002 | Camp, Jr. ................. | 455/566 |
| 6,480,149 B1 | 11/2002 | Sutherland et al. ...... | 342/357.1 |
| 6,898,283 B2* | 5/2005 | Wycherley et al. .... | 379/433.11 |
| 6,922,574 B2* | 7/2005 | Abbasi et al. ........... | 455/575.5 |
| 2001/0017598 A1 | 8/2001 | Townsend et al. ....... | 342/357.1 |
| 2002/0193943 A1* | 12/2002 | Hennelly ................ | 701/208 |
| 2003/0008670 A1* | 1/2003 | Katoh ..................... | 455/456 |
| 2003/0017839 A1* | 1/2003 | Mager ..................... | 455/550 |
| 2003/0017848 A1 | 1/2003 | Engstrom et al. ......... | 455/558 |

(Continued)

FOREIGN PATENT DOCUMENTS

JP 2003-066132 3/2003

(Continued)

*Primary Examiner*—Meless Zewdu
(74) *Attorney, Agent, or Firm*—Ware, Fressola, Van Der Sluys & Adolphson

(57) ABSTRACT

An interchangeable cover piece for a mobile communication device such as a cellular telephone replaces the standard cover piece to enable the mobile communication device to provide a specific functionality such as Global Positioning System (GPS) position location and mapping functionality associated with the interchangeable cover piece.

11 Claims, 4 Drawing Sheets

U.S. PATENT DOCUMENTS

| | | | |
|---|---|---|---|
| 2003/0073415 A1* | 4/2003 | Engstrom et al. | 455/90 |
| 2003/0190896 A1* | 10/2003 | Ota et al. | 455/90.3 |
| 2004/0137954 A1* | 7/2004 | Engstrom et al. | 455/566 |
| 2004/0203683 A1* | 10/2004 | Engstrom et al. | 455/418 |
| 2004/0203931 A1* | 10/2004 | Karaoguz | 455/457 |
| 2005/0130721 A1* | 6/2005 | Gartrell | 455/575.8 |

FOREIGN PATENT DOCUMENTS

| | | |
|---|---|---|
| WO | WO 01/60100 | 8/2001 |
| WO | WO 02/41607 | 5/2002 |
| WO | WO 03/36923 | 5/2003 |
| WO | WO 03/52948 | 6/2003 |

* cited by examiner

FUNCTION SPECIFIC INTERCHANGEABLE COVER PIECE FOR A MOBILE COMMUNICATION DEVICE

TECHNICAL FIELD

The present invention relates generally to mobile communication devices and more particularly to a function specific interchangeable cover for a mobile communication device such as a cellular telephone to add a functionality associated with the cover to the cellular telephone and more specifically Global Position System (GPS) location and mapping functionality to a cellular phone.

BACKGROUND OF THE INVENTION

Stand alone hand held cellular telephone devices and stand alone hand held position locating devices such as GPS devices are well known in the art. Hand held cellular telephone devices and hand held GPS devices operate in different frequency spectrums and function independently of each other. Typical cellular telephone devices do not have GPS position location mapping function capability and typical hand held GPS position location mapping function devices do not have cellular telephone capability.

There have been attempts in the prior art to combine a stand alone conventional cellular telephone with a separate stand alone GPS position location mapping module to provide a single combined function unit. One such representative device is available from Benefon Oyj, Salo, Finland under the trade name Benefon Track Pro. A disadvantage of such a combination device is the additional expense, bulk and complexity associated with the combination device as compared to a cellular telephone alone may not appeal to a consumer at the time of purchase and/or the consumer may desire to add GPS position location mapping function capability to the cellular phone at a later time. U.S. Pat. No. 5,786,789 discloses a prior art hand held communication device such as shown in FIG. 1 wherein the device 10 includes a position locating function and a cellular telephone function wherein one function is provided by a core module 12 and the second function is provided by an add-on module 14 which module 14 is attached to the device 10 in place of the battery power module 14 located in the position 16. The add-on module may be the battery power module including a built-in GPS unit that is added to the cellular telephone portion or alternatively may be a battery power module with a built-in cellular telephone unit that attaches to the GPS module or may be of other desired battery power module combinations. In any event, the resultant combination is less than desirable because it requires the attachment of an add-on module to provide the additional desired combined cellular telephone and GPS functionalities. The add-on module increases the size and bulk of the combination device. In addition, the appearance and packaging of the device is different than the originally configured cellular telephone and is changed with the addition of the add-on module. Further, the functionality and operation of the add-on module is generally substantially independent from the functionality and operation of the core module.

Another prior art combination is illustrated for example in FIG. 2 and attempts to add or connect a separate GPS module 22 to the base 24 of a cellular telephone 20 to provide a combined cellular telephone and a position location function capability is illustrated for example in FIG. 2. The disadvantage of such a combination is the added weight, size and bulk of the GPS module and cellular telephone combination and the complexity of interfacing the separate operating systems of each and the additional expense of the separate GPS module.

Accordingly, it would be desirable to provide a mobile communication device such as a cellular telephone that provides additional functionalities without the requirement of a separate independent, function specific add-on module that is attached to the cellular telephone to provide the additional functionality.

It would be further desirable to provide a mobile communication device having cellular telephone capability and GPS position location mapping function capability while maintaining substantially the size and appearance of the original by purchased cellular telephone device.

SUMMARY OF THE INVENTION

It is therefore an object of the present invention to provide a function specific interchangeable cover for use with a mobile communication device such as a cellular telephone to easily and conveniently add a desired functionality such as a GPS position location mapping function capability to the cellular telephone while maintaining the size and shape of the originally purchased cellular telephone device. The above objective has been achieved by providing an interchangeable cover piece having an associated specific function for use with a cellular telephone wherein the functionality associated with the cover piece interfaces with the cellular telephone to enable the cellular telephone to provide the functionality in addition to the cellular telephone desired functionality, for example, a GPS position location mapping functionality is provided without the need of an independent, separate function and specific add-on module. The function specific interchangeable cover piece may be implemented in any suitable and desired mechanical configuration to carry out the intended purposes, for example, the cover piece may be one of a front and back cover pair, or one of a top and bottom shell pair or any suitable mechanical configuration and style.

In accordance with a first embodiment of the invention, an interchangeable cover piece for a mobile communication device of the type including a main body element having upper and lower faces relative to usage, a screen constructed in at least a portion of the upper face of the main body element to provide a visible display of information to the user and suitable electronic circuitry to control and carry out the intended operational functions of the mobile communication device is presented. The cover piece includes a first covering element having a general size and shape corresponding to the general size and shape of the main body element of the mobile communication device such as a cellular telephone arranged for cooperating engagement with the main body element in an overlapping alignment with the upper face of the main body element. The first covering element has a suitable screen window for viewing the visible display of information when the first covering element is engaged with the main body element. The first covering element also carries global positioning system (GPS) circuitry for detecting the geographic location of the cover piece and generating suitable position data to identify the detected geographic location. The first covering element also carries interface circuitry for transferring the position data from the GPS circuitry to the electronic circuitry carried by the main body element whereby the mobile communication device enabled to provide GPS operational functionality.

In one aspect of the invention, the interchangeable cover piece includes a keypad constructed in at least another portion of the upper face wherein the keypad has an array of keys consistent with the intended function, and the interchangeable cover piece further has apertures in a pattern corresponding to the array of keys whereby the keys are accessible to the user.

In another aspect of the invention, the GPS operational functionality further includes a mapping functionality for showing a map representation on the screen display corresponding to the position data identifying the detected geographic location.

In a further aspect of the invention, the GPS operational functionality further includes showing a map representation on the screen display corresponding to a route between the position data identifying the detected geographic location and a desired destination location entered by the user into the mobile communication device.

In a still further aspect of the invention, the GPS antenna is carried by the first covering element.

In yet a further aspect of the invention, a flexible transmission ribbon is provided for electrically coupling the GPS antenna to the electronic circuitry carried by the main body element.

In yet a further aspect of the invention, the keypad is a communication keypad.

In a still yet further aspect of the invention, the GPS antenna is sized and shaped to utilize the volume of the communication keypad.

In an even further aspect of the invention, the GPS antenna is carried on the surface of the array of keys assembly defining the keypad.

In a still further aspect of the invention, map data information is stored in a memory contained in the main body element electronic circuitry for subsequent retrieval and use in showing a map representation on the screen display.

An interchangeable cover piece for a mobile communication device having cellular telephone functionality is presented. The device has a main body element with upper and lower faces relative to usage, a screen constructed in at least a portion of the upper face of the main body element to provide a visible display of information to the user and a keypad constructed in at least another portion of the upper face and having an array of keys assembly defining a communication keypad. The main body element further includes a source of power and suitable electronic circuitry for controlling and carrying out the intended operational functions of the device. The cover piece includes a first covering element having a general size and shape corresponding to the general size and shape of the main body element of the mobile communication such as a cellular telephone. The covering element is arranged for cooperating engagement with the main body element in an overlapping alignment with the upper face of the main body element. The first covering element has a suitable screen window for viewing the visible display of information and apertures in a pattern corresponding to the array of keys whereby the keys are accessible to the user when the first covering element is engaged with the main body element. The first covering element also carries a circuitry for generating suitable identification information corresponding to a specific functionality associated with the cover piece. The first covering element also carries interface circuitry for electrically coupling the identification information to the electronic circuitry carried by the main body element whereby the mobile communication device is conditioned to carry out the specific functionality of the cover piece.

In an aspect of the invention, the cover piece identifies GPS position location and mapping functionality.

In another aspect of the invention, the first covering element carries a GPS antenna.

In a further aspect of the invention, a flexible transmission is ribbon is provided to electrically connect the GPS antenna to the electronic circuitry carried by the main body element.

In a yet further aspect of the invention, a memory chip stores encoded data information identifying the specific functionality associated with the cover piece.

BRIEF DESCRIPTION OF THE DRAWINGS

Additional objects, features and benefits of the present invention will become readily apparent from the following written description taken in conjunction with the drawings wherein.

DETAILED DESCRIPTION OF PREFERRED EMBODIMENTS

Figure 1:
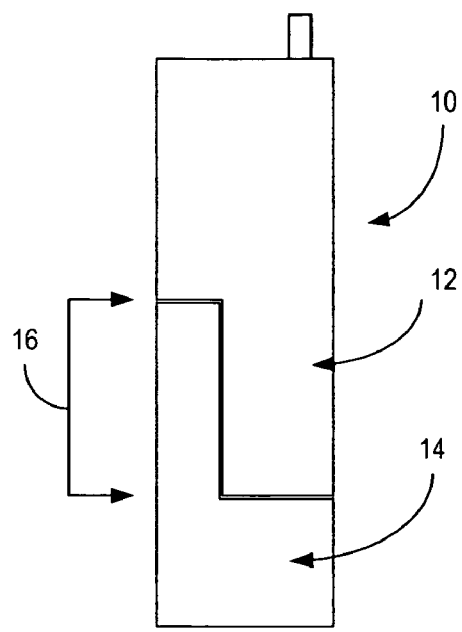
FIG. 1 is a schematic side elevational view of a prior art combination GPS and cellular telephone device showing the battery module with a built-in GPS device attached in place of the cellular telephone battery module.
Figure 2:
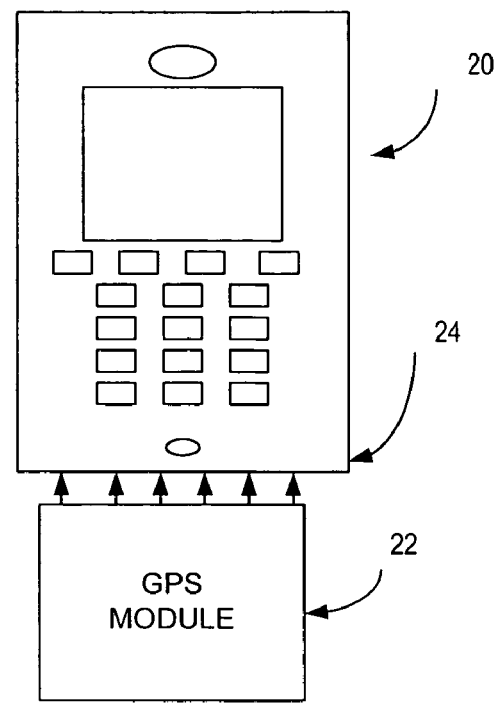
FIG. 2 is a schematic front plan view of a prior art combination GPS and cellular telephone device showing the GPS module connected to the base of a cellular telephone.
Figure 3:
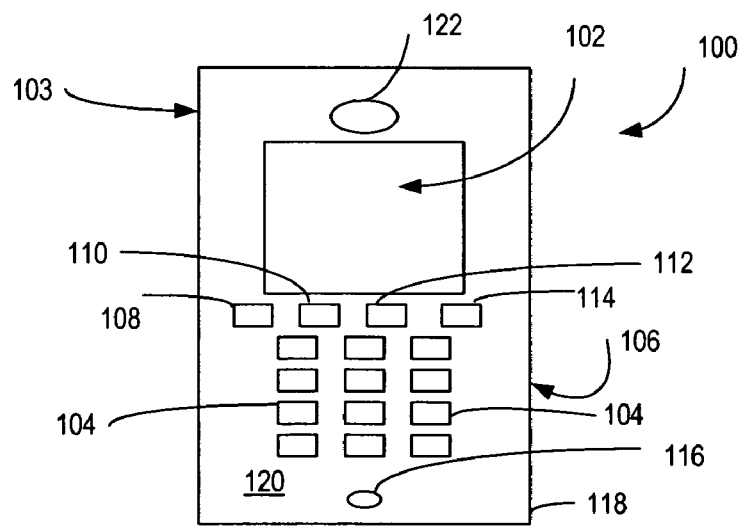
FIG. 3 is a schematic front plan view looking at the exterior face side of a function specific interchangeable cover piece embodying the present invention.
Figure 4:
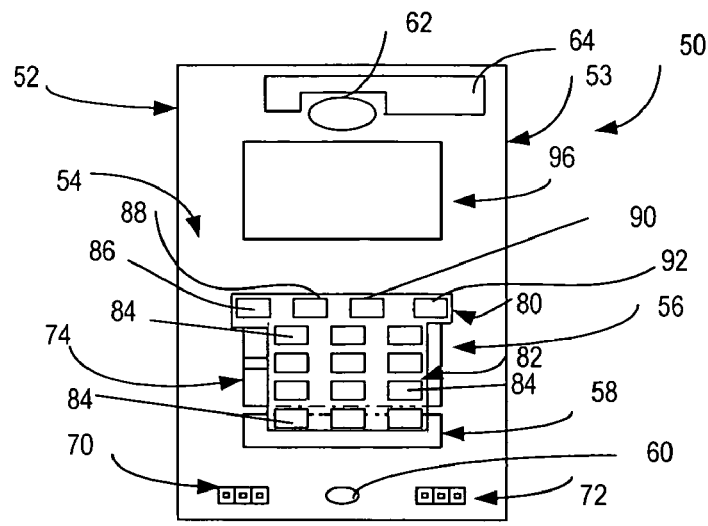
FIG. 4 is a schematic front plan view of the main body element of a mobile communication device of the type with which the interchangeable cover embodying the present invention may be used.

Now turning to the drawings and considering the invention in further detail a function specific interchangeable cover piece is presented in one illustrative embodiment for use with a mobile communication device such as a cellular telephone wherein the cover piece is designated generally 100 in FIG. 3 and the main body element of the type with which the interchangeable cover 100 may be used is designated generally 50 in FIG. 4. In the illustrative embodiment, the main body element 50 is illustrated in FIG. 4 in a schematic front elevation view and has an upper face generally designated 54 and a lower face generally designated 53 relative to usage. The standard conventional upper and lower cover pieces are removed to reveal the upper and lower faces and only the relevant functional components are shown for purposes of explanation and understanding of the invention. The main body element 50 includes a case or housing 52 typical of cellular telephones and made of a suitable material. The peripheral walls of the housing 52 define an interior cavity or chamber 54 arranged for carrying typical electronic circuitry for controlling and powering the device to carry out the intended cellular telephone operational functionality and the specific functionality associated with the function specific interchangeable cover piece as explained in further detail hereinbelow. The electrical interconnection paths between the electronic and controller circuitry and other components are not illustrated in the drawings because such electrical paths are not critical to gain an understanding of the present invention.

For purposes of the present example, the main body element 50 typically includes electronic and controller circuitry generally designated 56 and a power source such as a battery module generally designated 58 for powering the device. The main body element 50 further carries a user interface 80 in the form of a keypad generally designated 82 constructed in at least a portion of the upper face 54. The keypad 82 includes an array of keys or buttons 84, 84 assembly consistent with the intended function. For example, the keys may be used to enter alphanumeric character input signals to the device for dialing a number and the user interface 80 may further include various keys or buttons such as a menu select key 86 and function select keys 88, 90 and 92 associated with various operational features of the device for accessing features, entering data, and other such functions in a manner well known to those skilled in the art. The keys correspond to various functions and alphanumeric characters and cause the necessary signals to be generated for transfer to the electronic and controller circuitry 56 carried by the main body element 50 to activate the desired circuit operations or generate desired electrical signals in a manner well known to those skilled in the art. The user interface 80 and keypad module 82 may be of any suitable type now known or future developed to carry out the intended functions. The main body element 50 also includes display means or screen generally designated 96 constructed in another portion of the upper face 54 to provide a visible display of information to the user. The screen 96 may be a liquid crystal display (LCD) or other suitable display device technology well known by those skilled in the cellular telephone and display device art and also contemplates future developed displays.

The main body element 50 also carries an RF antenna generally designated 64 for sending and receiving the cellular telephone transmit and receive signals and operates in a manner well known to those skilled in the RF cellular telephone art. Circuitry for providing the RF functions is generally designated 74 and may be associated with the electronic and controller circuitry 56. The main body element 50 further includes a microphone 60 and a speaker 62 which microphone and speaker may be of any suitable type and design to carry out the intended functions. The main body element 50 in this example also includes an electrical contact arrangement carried by a connector 70 positioned for touching electrical contact with a correspondingly configured electrical contact arrangement carried by a connector or plug in the function specific interchangeable front cover piece 100 as explained below to condition the electronic and controller circuitry 56 to enable the cellular telephone to provide the specific function associated with the cover piece of the present invention. Optionally and as needed, a second connector 72 may be used and also has an electrical contact arrangement and is positioned and located in the main body element 50 for touching electrical contact with a correspondingly configured electrical contact arrangement carried by a connector or plug in the function specific interchangeable front cover piece. One purpose of the second connector 72 may be to provide a means for sensing the presence of the front cover piece and for identifying and distinguishing the functionality associated with and defined by the interchangeable front cover piece. The electrical contact arrangement is preferably coded to define the functionality and for sensing and detection purposes to cause the electronic and controller circuitry 56 to be conditioned to provide the specific functionality, such as, for example, a Global Positioning System (GPS) position location and mapping functionality. The connectors 70 and 72 and the electrical contact arrangement may be of any suitable type now known to those skilled in the art or future developed to carry out the intended function. The connectors 70 and 72 are also electrically connected to corresponding connection points within the electronic and controller circuitry and other components carried by the main body element 50 to form and define the necessary circuit configurations to carry out the intended operational functions of the mobile communication device when a respective function specific interchangeable front cover piece is placed in cooperating engagement with the main body element 50 in an overlapping alignment with the upper face 54 of the main body element.

The function specific interchangeable front cover piece 100 is illustrated in FIG. 3 in a schematic front elevation view showing the exterior face surface 120. The function specific interchangeable cover piece 100 includes a covering element generally designated 103 and has a general size and shape corresponding to the general size and shape of the main body element 50 and is arranged for cooperating engagement with the main body element in an overlapping alignment with the upper face 54 of the main body element 50. It will be recognized by those skilled in the art that the cover piece may be of configurations, shapes and sizes other than those illustrated herein. For example, the cover piece may have a top and bottom of a "cup" shape arranged for cooperating engagement with the main body element. The peripheral walls of the covering element 103 define an interior cavity or chamber 106 arranged for carrying the necessary circuitry and components to carry out in cooperation with circuitry carried in the main body element the intended function associated with the cover piece. The covering element 103 further includes openings or apertures 104, 104, 108, 110, 112, 114 through the face surface wall in a pattern corresponding to the array of keys assembly whereby the keys are accessible to the user. The covering element 103 also includes a suitable screen window 102 for viewing the visible display of information presented on the LCD display 96 when the covering element 103 is engaged with the main body element. The covering element 103 further includes suitable openings or apertures 116 such that acoustic energy may be communicated to the microphone when the cover piece 100 is engaged with the main body element 50. The covering element 103 also includes suitable openings or apertures 122 for the speaker such that audio or acoustic energy emitted from the speaker is communicated through the cover piece when the cover piece 100 is engaged with the main body element 50.

Although the function specific interchangeable cover piece embodying the invention is presented by way of illustration herein in cooperating engagement with the main body element in overlapping alignment with the upper face of the main body element, the function specific interchangeable cover piece may be implemented in any suitable and desired mechanical configuration to carry out the intended purpose. For example, the function specific interchangeable cover piece may replace the front cover piece as described above or may replace the rear cover piece, or may be one of a top and bottom of a shell pair covering the main body element or any other suitable mechanical configuration and style as desired.

Figure 5:
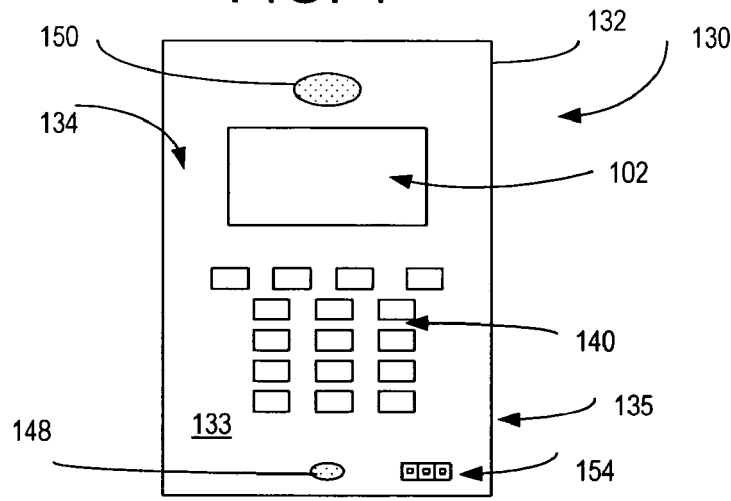
FIG. 5 is a schematic rear plan view looking into the interior side of one embodiment of a function specific interchangeable cover piece of the present invention.

Turning now to FIG. 5, a schematic rear elevation view showing the interior face surface 133 of the function specific cover piece of the present invention is illustrated therein and generally designated 130. The cover piece 130 includes a covering element generally designated 135 made of a suitable material for carrying the necessary circuitry components and interface circuitry for transferring electrical signals and information from the cover piece circuitry to the electronic circuitry carried by the main body element 50 whereby the mobile communication device is enabled to carry out the specific functionality, such as, for example, a Global Positioning System (GPS) position location and mapping functionality defined by the cover piece when the cover piece 130 is engaged with the main body element 50. In the illustrated embodiment of FIG. 5, the covering element 135 includes a microphone aperture 148 and a speaker aperture 150 through the face surface 133 positioned and located to be in alignment with the microphone 60 and speaker 62 respectively carried by the main body element 50 when the cover piece is engaged with the main body element. A connector or plug 154 is positioned and carried on the face surface 133 of the covering element 135 for alignment and connection with the corresponding connector 70 carried by the main body element 50 when the cover piece is engaged with the main body element. The connector 154 may be pin coded, i.e., only certain specific pins are provided in the connector and function as a unique identifier for purposes of identifying the specific functionality associated with the cover piece. Sensing and detecting circuitry in the electronic and controller circuitry 56 carried by the main body element 50 identify the function specific cover piece and in response thereto conditions the electronic and controller circuitry 56 to carry out the intended GPS functionality as defined by the coding of the function specific cover piece. In the embodiment of the function specific cover piece illustrated in FIG. 5, the antenna and receiver circuitry for the GPS position location and mapping functionality is carried by the main body element.

Figure 6:
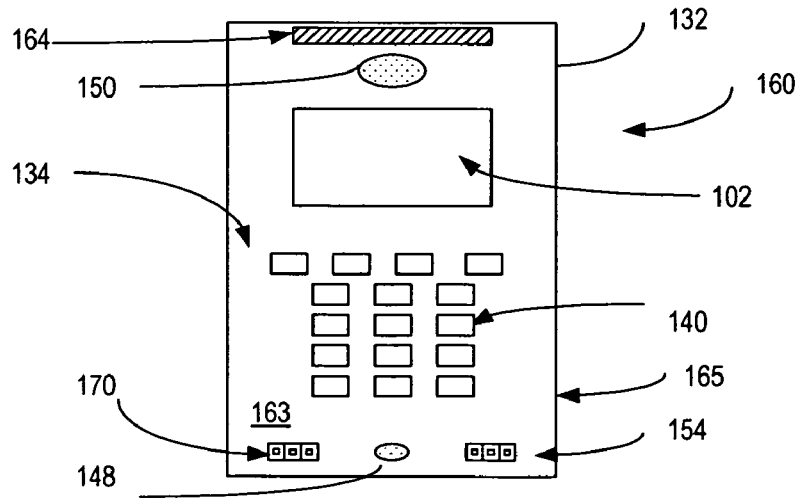
FIG. 6 is a schematic rear plan view looking into the interior side of another embodiment of a function specific interchangeable cover piece of the present invention.

Turning now to FIG. 6, a schematic rear elevation view showing the interior face surface 163 of an alternate embodiment of an interchangeable function specific cover piece of the present invention is illustrated therein and generally designated 160. The function specific interchangeable cover piece 160 illustrated in FIG. 6 is similar to the cover piece 130 illustrated in FIG. 5, wherein like numbered reference numerals in FIG. 5 and FIG. 6 correspond to like parts. In FIG. 6, the function specific cover piece 160 includes a covering element generally designated 165 and is configured and arranged to carry a suitable GPS antenna generally designated 164. Alternately, the RF antenna 64 carried by the main body element 50 may be employed in the GPS functionality. A connector or plug 154 is positioned and located on the face surface 163 of the covering element 165 for alignment and connection to the corresponding connector 70 carried by the main body element 50 when the cover piece 160 is engaged with the main body element. The covering element 165 may also carry a second connector or plug 170 located and positioned for alignment and connection with the corresponding connector 72 carried by the main body element 50 when the cover piece 160 is engaged with the main body element. The controller circuitry 56 carried by the main body element 50 includes sensing and detecting circuitry in a similar manner as discussed in connection with FIG. 5 to identify the specific function of the cover piece. The plug 170 may likewise be pin coded for purposes of identifying the specific functionality associated with the cover piece.

Figure 7:
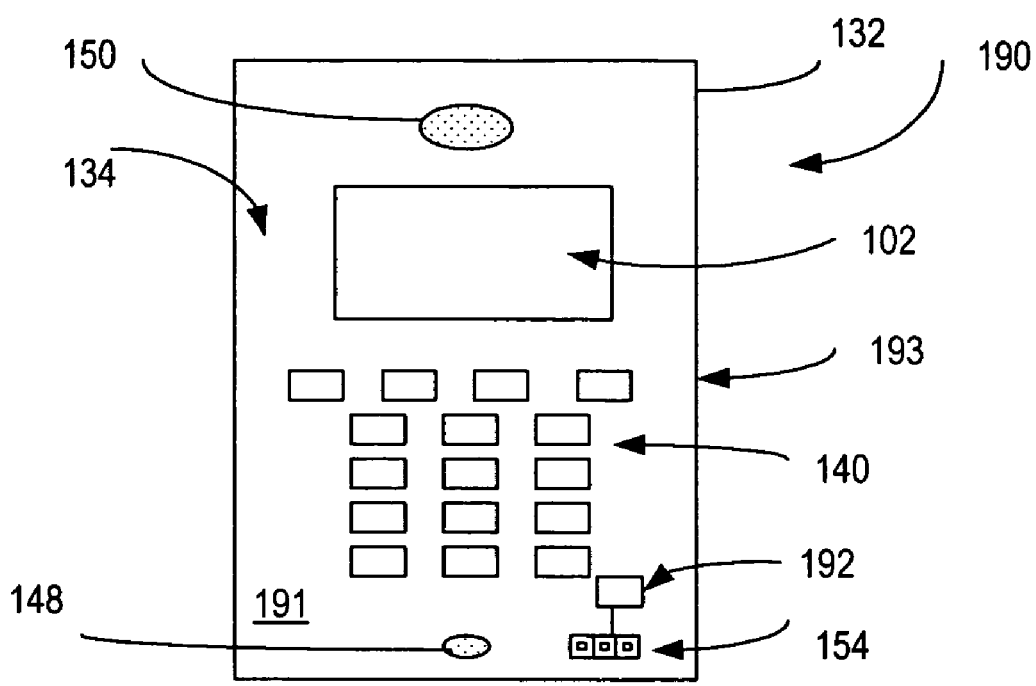
FIG. 7 is a schematic rear plan view looking into the interior side of a further embodiment of a function specific interchangeable cover piece of the present invention wherein the specific function information is encoded in a chip.

Turning now to FIG. 7, a further alternate embodiment of a function specific interchangeable cover piece is illustrated therein as a schematic rear elevation view showing the interior face surface 191 and is generally designated 190. The function specific cover piece 190 illustrated in FIG. 7 is similar to the front cover 130 illustrated in FIG. 5 and like parts have like reference numerals. In the embodiment of FIG. 7, the function specific cover piece includes a covering element generally designated 193 and carries a memory such as a chip memory device for example generally designated 192 electrically connected to the connector 154 wherein the specific function information associated with the cover piece is encoded within the chip 192. The encoded information within the chip 192 is transferred to the controller circuitry 56 carried by the main body element 50 when the cover piece 190 is engaged with the main body element. The controller circuitry 56 senses and detects the identity of the function specific interchangeable cover piece and conditions the controller circuitry 56 to carry out the functionality such as, for example, Global Position System (GPS) position and mapping functionality as defined by the information within the chip 192 carried by the function specific cover piece. It will be appreciated that the data encoded within the chip 192 may also be utilized to activate a range of options and features associated with the corresponding function specific cover piece and that any suitable memory now known or future developed may be utilized in place of the chip memory device shown.

The controller circuitry 56 thus conditions the operational circuitry of the mobile communication device to carry out the intended cellular telephone functionality and GPS position and mapping functionality. The various functions and features of the cellular telephone and the GPS functionality may be selected by the user through the menu select key 108 or any of the function keys 110, 112, 114 as desired through a menu sequence shown on the display 96 or may follow a predetermined sequence in accordance with an instruction set stored in and retrieved from a memory of a processor or a separate memory module in cooperation with suitable processing means carried in the electronic and controller circuitry 56. Likewise, the baseband circuitry associated with processing the audio signals and location generation and identification signals may be integrated with the electronic and controller circuitry 56 carried by the main body element 50.

Figure 8:
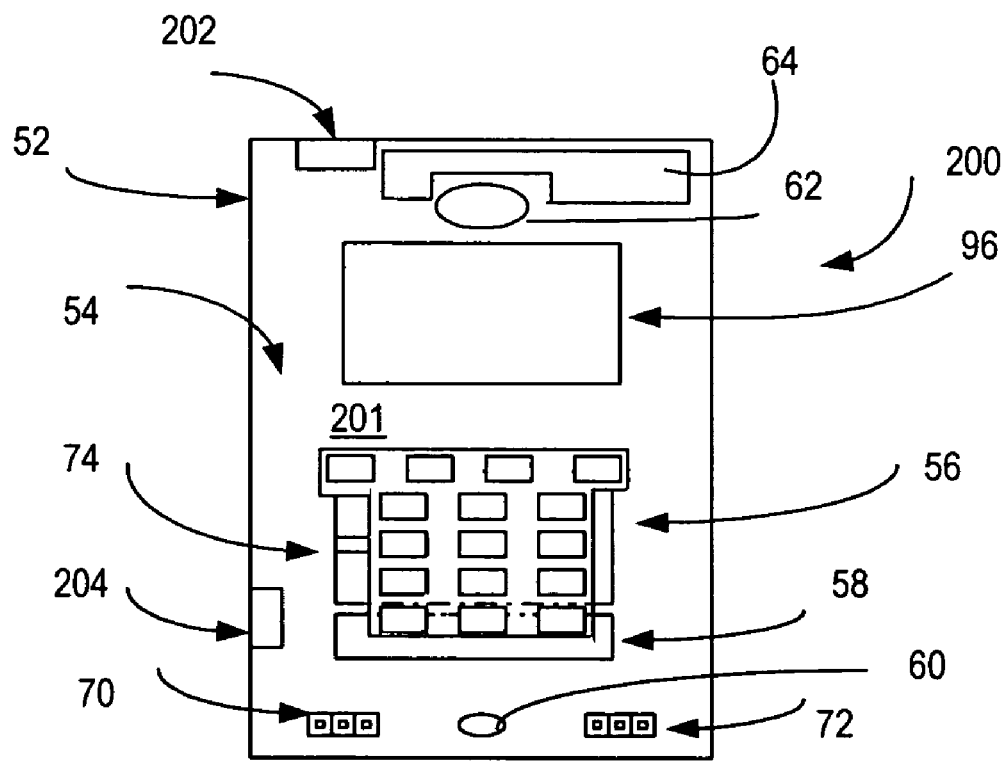
FIG. 8 is a schematic front plan view of the main body element of an alternate embodiment of a mobile communication device of the type with which the interchangeable cover embodying the present invention may be used.

Turning to FIG. 8, a schematic front elevation view showing the interior face surface 201 of a further alternate embodiment of a main body element of the type with which the function specific interchangeable cover piece embodying the present invention may be used and is illustrated therein and generally designated 200. The main body element 200 is similar to the main body element 50 illustrated in FIG. 4 and like parts have like reference numerals. The main body element 200 includes any suitable means well known to those skilled in the art or future developed for coupling data signals representative of system operating programs, data storage, graphics, and other such information related to the functionality of the mobile communication device between the device and external devices. Such information may include for example, typical conventional information such as an address book, games, telephone directory, operational settings, and other such features commonly found in cellular telephones. As illustrated in FIG. 8, the main body element 200 includes an infrared (IR) communication port 202 which may be utilized in a well known manner to communicate information to and from the mobile communication device. Optionally, the main body element 200 may include a data connector or communication port generally designated 204 for receiving a cable from a personal computer, personal digital assistant, or other such device to transfer information to and from the devices and the mobile communication device having a function specific interchangeable cover piece embodying the present invention. For example, specific map data information to provide a map representation of a desired location may be down-loaded to a personal computer via the global computer network and then transferred to the memory in the electronic and controller circuitry 56 carried by the main body element for subsequent retrieval. Likewise, a library of map data information and software applications for carrying out desired mapping functions or operational tasks can be stored on a computer readable medium and downloaded to a computer for transfer to the device. Additional information generally associated with the GPS position location and mapping functionality may also be input to the communication device via the data connector 204 in a manner well known to those skilled in the art.

Figure 9:
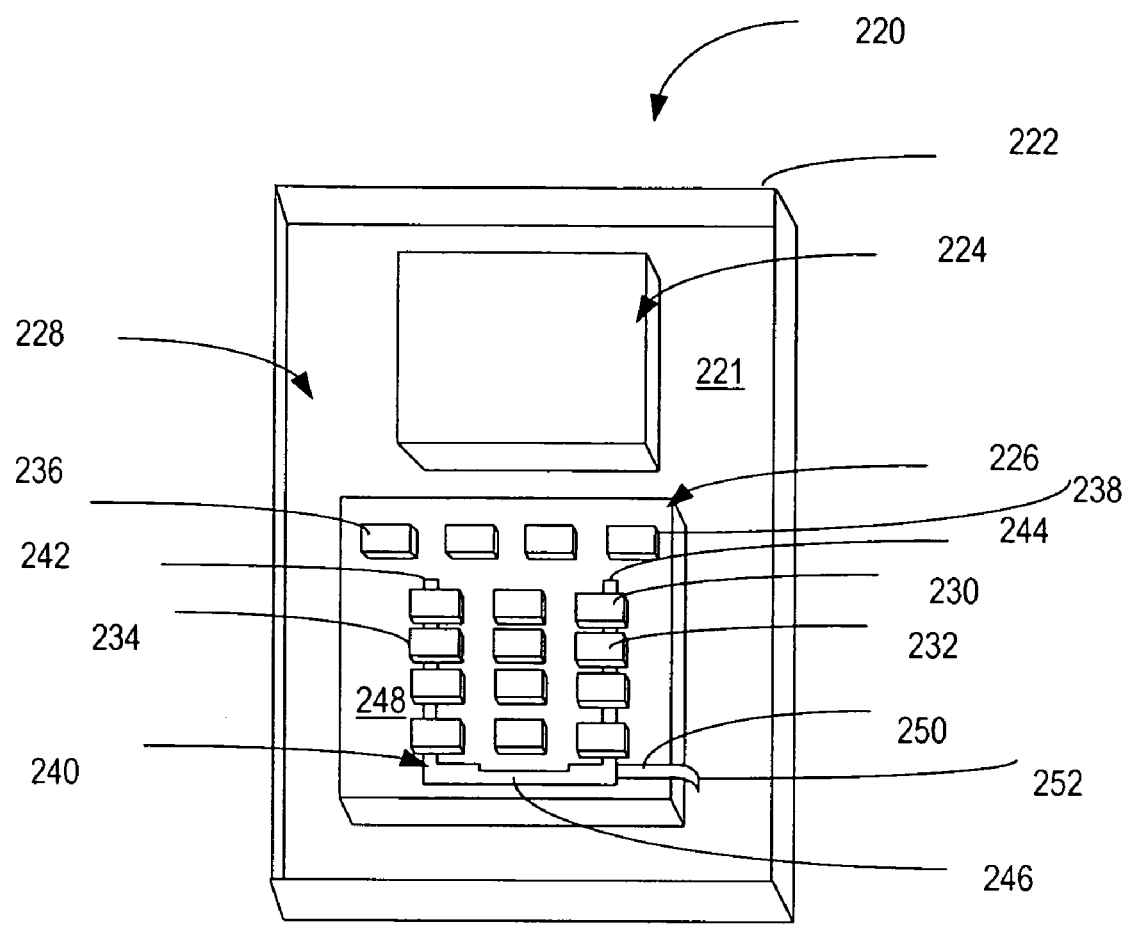
FIG. 9 is a schematic perspective view of the main body element of an alternate embodiment of a mobile communication device of the type with which the interchangeable cover embodying the present invention may be used showing the GPS antenna sharing the same volume space as the keypad.

Turning now to FIG. 9, a schematic front elevation view showing the interior face surface 221 of a further alternate embodiment of a main body element of the type with which the function specific interchangeable cover piece embodying the present invention may be used is illustrated therein and generally designated 220. The main body element 220 is similar to the main body elements 50, 200 discussed and illustrated above and carries similar functional circuitry elements and operates in a similar manner to that described above to carry out the intended cellular telephone functionality and GPS position location and mapping functionality. The main body element 220 includes a covering element 222 of a suitable material and has a desired shape and size to accommodate the particular design configuration of the mobile communication device. The covering element 222 carries a screen or display device 224 and a keypad or keymat 226 having an array of keys assembly consistent with the intended function. The keypad 226 includes keys 230, 232, 234 typically arranged in a conventional 3×4 matrix as commonly found in cellular telephone mobile communication devices. The keypad 226 also typically includes a number of function keys 236, 238 which together with the keys 230, 232, 234 cause the necessary signals to be generated for transfer to the electronic and controller circuitry carried by the main body element to activate the desired circuit operations or generate desired electrical signals in a manner well known to those skilled in the art. In the embodiment illustrated in FIG. 9, a GPS antenna generally designated 240 is carried on the surface 248 of the keypad 226. The GPS antenna 240 is U-shaped and has oppositely disposed legs 242, 244 connected by a bridging portion 246 to form the U-shape configuration carried on the surface 248. A flexible transmission ribbon or multi-conductor foil 250 couples the GPS antenna 240 to the RF circuitry carried by the main body element via the connecting end 252. The connection between the flexible transmission ribbon and the GPS antenna and circuitry are well known to those skilled in the art. The flexible transmission ribbon 250 may also include and carry other electrical signals, for example, from the keypad 226 to the appropriate circuitry carried by the main body element 220. The GPS antenna 240 is made of a suitable material and is dimensioned to provide the appropriate wavelength and impedance matching for the given circuitry and such wavelengths and impedance matching is well known to those skilled in the antenna art. Likewise, the form factor of the GPS antenna 240 may be of different sizes and shapes and may be contoured and configured to fit substantially integral with or may be made part of the walls forming the surface of the keypad. The GPS antenna may be molded along with the keypad during for example the injection molding process, vacuum molding process or other fabrication techniques well known to those skilled in the art.

It is contemplated that the mobile communication device having a function specific interchangeable cover piece embodying the present invention also provides GPS position location and navigational features such as position coordinates, speed, heading, way-points, routes, trip odometer, distance measurement, compass guides, movement tracking and positional locating and other such desired features known in the art. In addition, it is contemplated that map data information may be downloaded to the electronic and controller circuitry 56 carried by the main body element utilizing standard mobile mapping services with personal computers, or Internet browsers. In this way, a user may select for viewing on the display of the mobile communication device a map representation according to the coordinates identifying the geographic location of the cover piece used with the mobile communication device. The coordinates may be entered via the user interface or may be automatically entered via the inherent GPS locating capability of the cellular telephone. Likewise, the coordinates corresponding to a desired geographic location such as a specific city or street address may be entered via the user interface to retrieve a map representation of the location. Likewise, one or more desired geographic locations can be entered or selected via the user interface to retrieve and display a map representation corresponding to a route or itinerary between the existing position location of the device and the entered or selected location. It is also contemplated that the location of the device along the route is shown on the map representation as the device physically travels.

Although it is contemplated that the connectors 66, 70, 72 carried by the main body element 50, 200 will mate with and connect to the connectors or plugs 152, 154, 170 carried by the respective function specific cover pieces 130, 160, 190, other connection means such as flat, ribbon cable or other galvanic connections known in the art may be used to carry analog and digital data signals and electrical power between and within the respective cover pieces. In addition, other suitable interconnection means now known or future developed are also contemplated to carry out the intended functions.

A function specific interchangeable cover piece for use with a mobile communication device such as a cellular telephone to add specific functionalities, such as GPS position location and mapping functionality to the cellular telephone has been presented above in several preferred embodiments. It will be understood by those skilled in the art that numerous changes and modifications may be made to the examples described above without departing from the spirit and scope of the invention. Therefore, the invention has been presented by way of illustration rather than limitation.

The invention claimed is:

1. An apparatus, comprising:
a replacement cover for a wireless communication device without global positioning system (GPS) functionality fabricated in a desired shape and suitably arranged for co-operating engagement with a main body element of the wireless communication device without global positioning system (GPS) functionality so as to form an enclosure for the wireless communication device to replace the cover of the wireless communication device without global positioning system (GPS) functionality, said replacement cover further configured and arranged with suitable electronic components operatively interconnected to add and enable a global positioning system (GPS) functionality in the wireless communication device subsequent to the purchase of the wireless communication device without global positioning system (GPS) functionality.

2. The apparatus as defined in claim 1 wherein said replacement cover is further configured with a suitable global positioning system (GPS) antenna.

3. The apparatus as defined in claim 2 wherein said replacement cover is further configured with an appropriately dimensioned, shaped and contoured global positioning system (GPS) antenna to fit within said replacement cover.

4. The apparatus as defined in claim 1 wherein said replacement cover is further configured with a suitable global positioning system (GPS) antenna sized and shaped and arranged for carrying by said communications keypad.

5. The apparatus as defined in claim 1 wherein said replacement cover is further configured with a communications keypad having a suitably arranged array of keys.

6. The apparatus as defined in claim 1 wherein said suitable electronic components are further configured for detecting the geographic location of the wireless communication device with said added global positioning system (GPS) functionality and for generating position data identifying the detected geographic location.

7. The apparatus as defined in claim 6 further arranged for transferring said position data to a processing unit in the wireless communication device for providing a map representation on a display screen of the wireless communication device corresponding to the identified geographic location.

8. The apparatus as defined in claim 7 further arranged for providing a map representation on the display screen of the wireless communication device a route between the identified geographic location and a destination geographic location.

9. The apparatus as defined in claim 8 further configured with a suitable memory device for storing position data correlating to a geographic location for providing a corresponding map representation.

10. An apparatus, comprising:
a wireless communication device without global positioning system (GPS) functionality configured with a main body element having a cover, a display screen, a processing unit; and
a replacement cover configured in a desired shape and suitably arranged for co-operating attachment to said main body element so as to form an enclosure for the wireless communication device to replace the cover of the wireless communication device without global positioning system (GPS) functionality;
the replacement cover further configured with an appropriately dimensioned, shaped and contoured GPS antenna to fit within the cover; and further configured with suitable electronic components operatively interconnected and arranged for enabling a global positioning system (GPS) functionality in the wireless communication device for detecting the geographic location of the wireless communication device with said added global positioning system (GPS) functionality, and for generating position data identifying the detected geographic location, and for transferring said position data to said processing unit for providing a map representation on said display screen corresponding to the identified geographic location such that the wireless communication device without global positioning system (GPS) functionality is enabled with global positioning system (GPS) functionality subsequent to the time of purchase of the wireless communication device without global positioning system (GPS) functionality.

11. A method, comprising:
a main body element of a wireless communication device without global positioning system (GPS) functionality having a cover forming an enclosure for the wireless communication device responsive to a replacement of the cover of the wireless communication device without global positioning system (GPS) functionality with a replacement cover arranged with an appropriately dimensioned, shaped and contoured GPS antenna configured to fit within the replacement cover and suitable electronic components operatively interconnected and arranged for enabling the global positioning system (GPS) functionality in the wireless communication device responsive to a GPS signal for detecting a geographic location of the wireless communication device with said added global positioning system (GPS) functionality and for generating position data identifying the detected geographic location and for transferring position data to a processing unit for providing a map representation on a display screen corresponding to the identified location such that the wireless communication device without global positioning system (GPS) functionality is enabled with global positioning system (GPS) functionality subsequent to the time of purchase of the wireless communication device without global positioning system (GPS) functionality.

* * * * *